B. HOLT.
TRACTION ENGINE.
APPLICATION FILED DEC. 22, 1909.

1,026,037.

Patented May 14, 1912.

2 SHEETS—SHEET 1.

Witnesses,
F. E. Maynard.
Charles Pickles

Inventor,
Benjamin Holt,
By G. H. Strong
his Atty

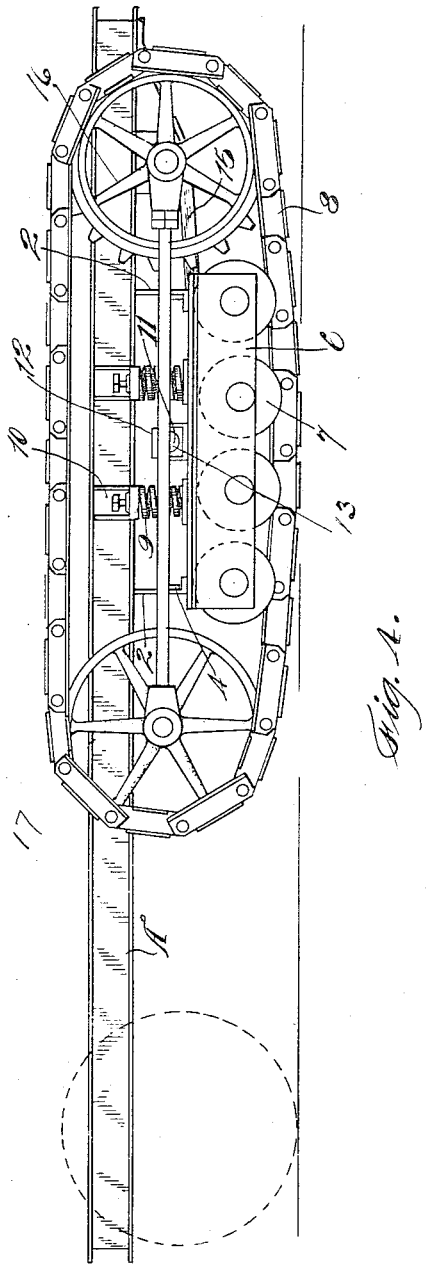

UNITED STATES PATENT OFFICE.

BENJAMIN HOLT, OF STOCKTON, CALIFORNIA.

TRACTION-ENGINE.

1,026,037.   Specification of Letters Patent.   Patented May 14, 1912.

Application filed December 22, 1909. Serial No. 534,420.

*To all whom it may concern:*

Be it known that I, BENJAMIN HOLT, a citizen of the United States, residing at Stockton, in the county of San Joaquin and State of California, have invented new and useful Improvements in Traction-Engines, of which the following is a specification.

This invention relates to wheel trucks, and particularly to trucks for traction engines.

This invention has for its object to provide a strong, stiff frame, and a flexible, yieldable truck for traction engines, and an important object is to provide a truck having resilient connection with a main frame, and combining means permitting the truck to rock relative to the frame, and allowing the truck members to oscillate relative to each other.

The invention consists of the parts and the construction and combination of parts as hereinafter more fully described and claimed, having reference to the accompanying drawings, in which—

Figure 1:
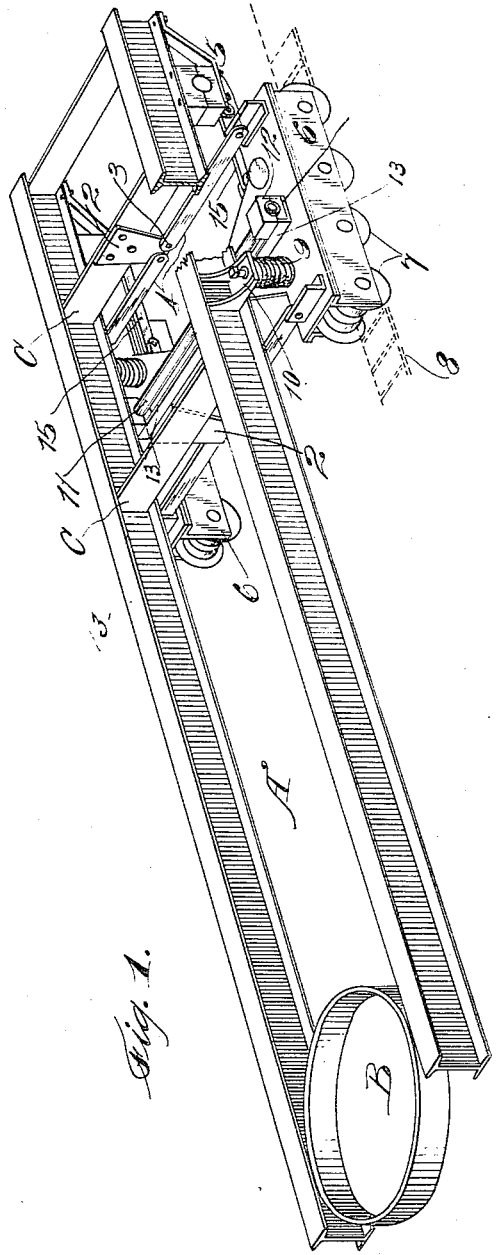
Figure 2:
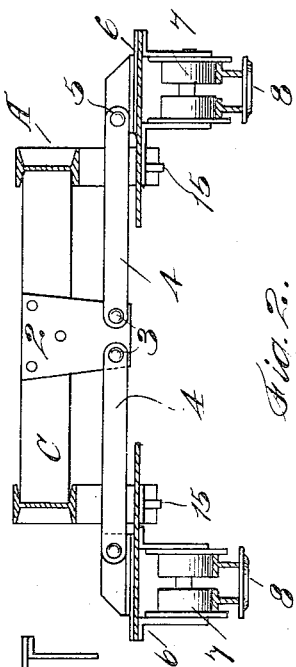
Figure 3:
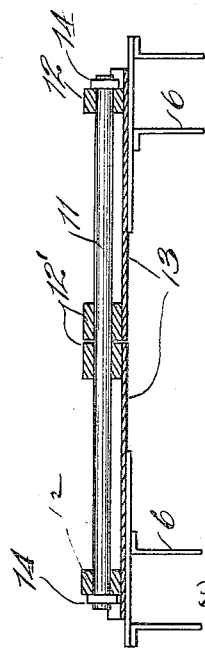

Figure 1 is a perspective of the structure, partly broken away. Fig. 2 is a transverse section of the truck and frame. Fig. 3 is a similar section of the truck showing the tie-rod in elevation. Fig. 4 is a side elevation of a truck.

The embodiment of my invention as illustrated comprises a suitable frame A, to one end of which is secured an appropriate member B adapted to receive a steering-mechanism of any preferred form, which is not shown, and at desirable points the frame A may be braced by numerous tie bars and plates or their equivalents, C. Securely fastened to convenient tie bars C—C are plates 2 to which are pivoted as at 3, reach or spacer links 4, transversely disposed and pivoted at 5, to roller trucks 6. There is one of these tracks on each side of the frame, and each is provided with a plurality of rollers 7 adapted to bear upon a suitable flexible traveling belt or platform 8 which travels around a rear sprocket-wheel 16 and front idler 17 journaled on frame A, Fig. 4. Resting upon each truck 6 are springs 9, engaging projecting brackets 10 secured to the frame A, thus affording a strong resilient connection between the frame and each truck and yieldingly supporting the frame on the trucks.

For the purpose of maintaining the trucks upright and keeping them from tipping over, and at the same time permit each truck to oscillate independently of the other as the vehicle progresses over rough and uneven ground, or even over ordinary roads or streets, I employ the cross-rod 11 which turns free at the ends in journal-boxes 12 on the trucks; and in conjunction with rod 11 I employ the arms 13 which are attached each to a truck and extend inward and are secured to boxes 12' carried centrally on rod 11, or are otherwise sustained. The arms 13 practically abut, preventing the trucks tilting sidewise; and in order to prevent excessive spreading, the tie rod is provided with set collars 14 approximately near its ends and adjacent to the outer boxes 12.

By this construction the trucks may tilt endwise relatively to the frame A, upon the pivots 3, and they may rock independently on the rod 11, the frame meanwhile being yieldingly supported on the truck springs 9, is effectually protected from the racking and destructive vibrations of the trucks. The links 4 provide means whereby the side of the trucks 6 are maintained in parallelism with the side of the frame A and suitable connections, as the radius rods 15, are employed to sustain the trucks and prevent excessive longitudinal motion of them relative to the frame. It will be seen therefore that the springs are relieved from all tensile or torsional strain, and are required only to yieldingly support the frame, and are not depended upon to tie the trucks to the frame.

The great advantage obtained by this peculiar design and structure is in saving the frame A from violent vibration, and allowing the trucks to independently yield in conformity to undulating surfaces, thereby producing greater tractive efficiency, and the links are an effective preventive against twisting strains reaching the frame.

Having thus described my invention, what I claim and desire to secure by Letters Patent is—

1. The combination with a main frame and flexible endless traction members, of independent wheeled trucks upon which opposite sides of the frame are supported, said trucks being located within said traction members, journal boxes fixed to the trucks, a transverse shaft mounted in said boxes and about which the boxes and trucks may oscillate, and springs located between the trucks and the main frame.

2. The combination with a main frame, of a pair of endless, flexible, traction members, trucks on opposite sides of the frame and within the traction members, a shaft disconnected from the main frame and pivotally connecting the trucks so that each truck has a free, limited, oscillating vertical motion, springs interposed between the main frame and the trucks and supporting the load on the trucks, and means for maintaining the trucks parallel with the main frame.

3. The combination with a main frame and flexible, endless, traction members, of wheeled trucks upon which opposite sides of the frame are supported, said trucks being located within said traction members, journal boxes fixed to the trucks approximately midway of their length, a transverse shaft about which the boxes and trucks may oscillate, springs located contiguous to the shaft and compressible between the trucks and main frame, and transverse distance bars pivoted to the trucks, and centrally to the main frame.

4. The combination with a main frame and flexible, endless traction members, of independent wheeled trucks upon which opposite sides of the main frame are supported, said trucks being located within the traction members, a centrally journaled transverse shaft about which the trucks may oscillate, springs contiguous to the shaft, upon which springs the main frame is supported, transverse distance bars having their outer ends pivoted to opposite ends of the trucks, and their inner ends approximately midway between the sides of the main frame.

5. The combination with a main frame and flexible, endless, traction members, of independent wheeled trucks outside of the main frame and located within said traction members, springs upon the trucks upon which the main frame is supported, a shaft journaled across the trucks and about which said trucks may oscillate, and radius rods extending longitudinally and having their opposite ends fulcrumed respectively to the trucks and the main frame.

6. The combination with a main frame and flexible, endless traction members, of wheeled trucks within said traction members and swiveled to oscillate about a normally horizontal axis, springs mounted upon the trucks upon which springs the rear portion of the main frame is supported, transverse distance bars connecting the truck frames with the longitudinal central portion of the main frame, and longitudinally disposed radius rods between the trucks and the main frame.

7. The combination of a main frame and flexible, endless traction members, wheeled truck frames within said traction members and flexibly connected with opposite sides of the main frame, elastic means carried by the trucks, and upon which the main frame is supported, and arms or plates extending from the upper members of the truck frames, and substantially abutting beneath the main frame.

8. The combination with a main frame and flexible, endless traction members, of wheeled trucks within the traction members and swiveled to oscillate about a normal horizontal axis, springs mounted upon the trucks, upon which springs the rear portion of the main frame is supported, transverse distance bars having their outer ends pivoted to the upper portion of the truck frame, and extending beneath the main frame, and a plate depending centrally from a transverse member of the main frame, to which plate the inner ends of said bars are pivoted.

9. The combination of a main frame, wheeled truck frames flexibly connected with opposite sides of the main frame, whereby they may oscillate about a normal, centrally disposed horizontal axis, and elastic means carried by the trucks, and upon which the main frame is supported, endless movable belts upon which the truck wheels travel, and transverse distance and longitudinal radius rods.

10. The combination with a main frame, of a pair of endless, flexible, traction members, trucks on opposite sides of the frame and within the traction members, an offset arm fixed to each truck and extending transversely of the vehicle with means for pivotally supporting the ends of said arms so that each truck has a limited, independent, vertical rocking motion, and springs interposed between the main frame and the trucks.

11. The combination with a main frame, of a pair of endless, flexible, traction members, independent trucks on opposite sides of the frame and within the traction members, springs interposed between the main frame and the trucks for yieldingly supporting the load on the trucks, and pivotal connecting means by which each truck is permitted an independent vertical oscillatory motion to accommodate each truck to inequalities in the path traversed by it.

12. In a traction engine, the combination with a main frame having a steering wheel and a flexible, endless traction member, of a truck within said traction member and supported on the ground run of the traction member, means for yieldingly supporting the frame on the truck, guide wheels journaled on the frame and at the ends of and independent of the truck, and around which wheels said endless traction member travels, means for maintaining the truck upright, and a link connection between the frame and an end of the truck to limit the endwise movement of the truck inside of the traction member.

13. The combination of a main frame and flexible, endless traction members, trucks located within said traction members, springs between the frame and trucks and on which the frame is supported, front and rear wheels for each truck and in the plane thereof and journaled on the frame and independent of the truck, and around which wheels the respective traction members travel, and a transversely disposed, yieldingly supported, central pivot member about which each truck may oscillate independently.

14. In a traction engine, the combination of a frame, two flexible, endless, traveling traction members, end wheels journaled on the frame around which each of said members travels, a truck within each member against which the ground run of the traction member is supported, springs interposed between the frame and trucks whereby the trucks and traction members may yield intermediate of said wheels, each truck swiveled to oscillate independently about a horizontal axis, transverse distance bars connecting the trucks with the frame, and links pivoted to the ends of the trucks and to the frame to limit the longitudinal movement of the trucks with respect to the frame.

15. In a self-propelled vehicle, the combination with the main frame and flexible endless traction members, of independent trucks located within the traction members, means for yieldingly supporting the frame from the trucks, and transverse extensions rigid with the trucks and pivotally supported to maintain the trucks in upright position and permit independent vertical rocking movement of each truck.

16. In a traction engine, the combination of a main frame having a front steering wheel and flexible, endless, traction members, trucks supporting the rear of the frame and around which the traction members travel, said trucks having their front and rear ends pivotally connected with the frame to keep the trucks in line, and intermediate yielding connections between the trucks and independent of the frame for keeping the trucks upright and permitting them to oscillate independent of one another, said connections including a shaft extending between the trucks and journaled at its ends on the trucks, and arms having each an end fixed to a truck and the other ends of the arms turning loose on said shaft.

17. In a vehicle, the combination of a main frame and a pair of sprockets journaled on each side of the frame, the sprockets of each pair arranged in line and themselves supporting no part of the weight of the vehicle, an endless flexible track belt passing around and guided by each pair of sprockets, a truck traveling on the ground run of each belt, resilient means interposed between each truck and frame, each truck having a longtiudinally extended operative face normally in a plane below the level of its sprockets whereby the weight comes on the trucks and not on the sprockets, and a transverse rigid extension for each truck, each extension having a pivotal support at one side of the truck and arranged so that the two trucks are maintained upright and each truck is permitted to rock and yield vertically independent of the other.

In testimony whereof I have hereunto set my hand in the presence of two subscribing witnesses.

BENJAMIN HOLT.

Witnesses:
T. W. FOWLER,
C. W. FOWLER.